United States Patent [19]
Szczepanek et al.

[11] Patent Number: 5,113,418
[45] Date of Patent: May 12, 1992

[54] ELASTIC BUFFER FOR LOCAL AREA NETWORK

[75] Inventors: Andre Szczepanek, Bedford; George Buchanan, Sherington, both of England

[73] Assignee: Texas Instruments Incorporated, Dallas, Tex.

[21] Appl. No.: 417,997

[22] Filed: Oct. 6, 1989

Related U.S. Application Data

[63] Continuation of Ser. No. 808,149, Dec. 12, 1985, Pat. No. 4,884,286.

[51] Int. Cl.⁵ .............................................. H04L 7/00
[52] U.S. Cl. ..................................... 375/118; 370/102; 370/108
[58] Field of Search ................. 375/106, 110, 118; 328/63, 72; 307/269; 370/100, 102, 108

[56] References Cited

U.S. PATENT DOCUMENTS

| | | | |
|---|---|---|---|
| 3,531,777 | 9/1970 | West | 178/69.5 |
| 3,708,690 | 1/1973 | Paivinen | 377/129 |
| 4,181,975 | 1/1980 | Jenkins | 328/155 |
| 4,187,394 | 2/1980 | Sievers | 375/118 |
| 4,270,183 | 5/1981 | Robinson et al. | 375/118 |
| 4,287,577 | 9/1981 | Deal, Jr. | 365/233 |
| 4,580,279 | 4/1986 | Kahn | 370/102 |
| 4,596,026 | 6/1986 | Cease et al. | 375/118 |

Primary Examiner—Stephen Chin
Attorney, Agent, or Firm—Robby T. Holland; James F. Hollander; Richard Donaldson

[57] ABSTRACT

An elastic buffer for absorbing frequency jitter or drift of an incoming data signal which includes a serial stack of data registers. These data registers are used for storing data bits from an incoming data stream one at a time with each bit adjacent a next earlier bit at a frequency equal to the frequency of the incoming data and also for releasing stored bits onto an output data line. The stored bits are released one at a time at a predetermined fixed rate equal to the average frequency of incoming data from a number of registers away from the register into which data is being written which depends on the frequency difference between incoming data and the fixed rate aforesaid.

11 Claims, 4 Drawing Sheets

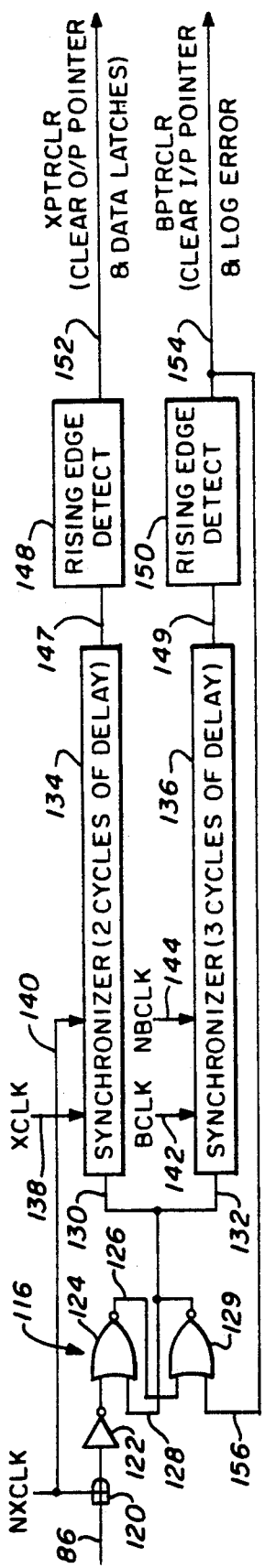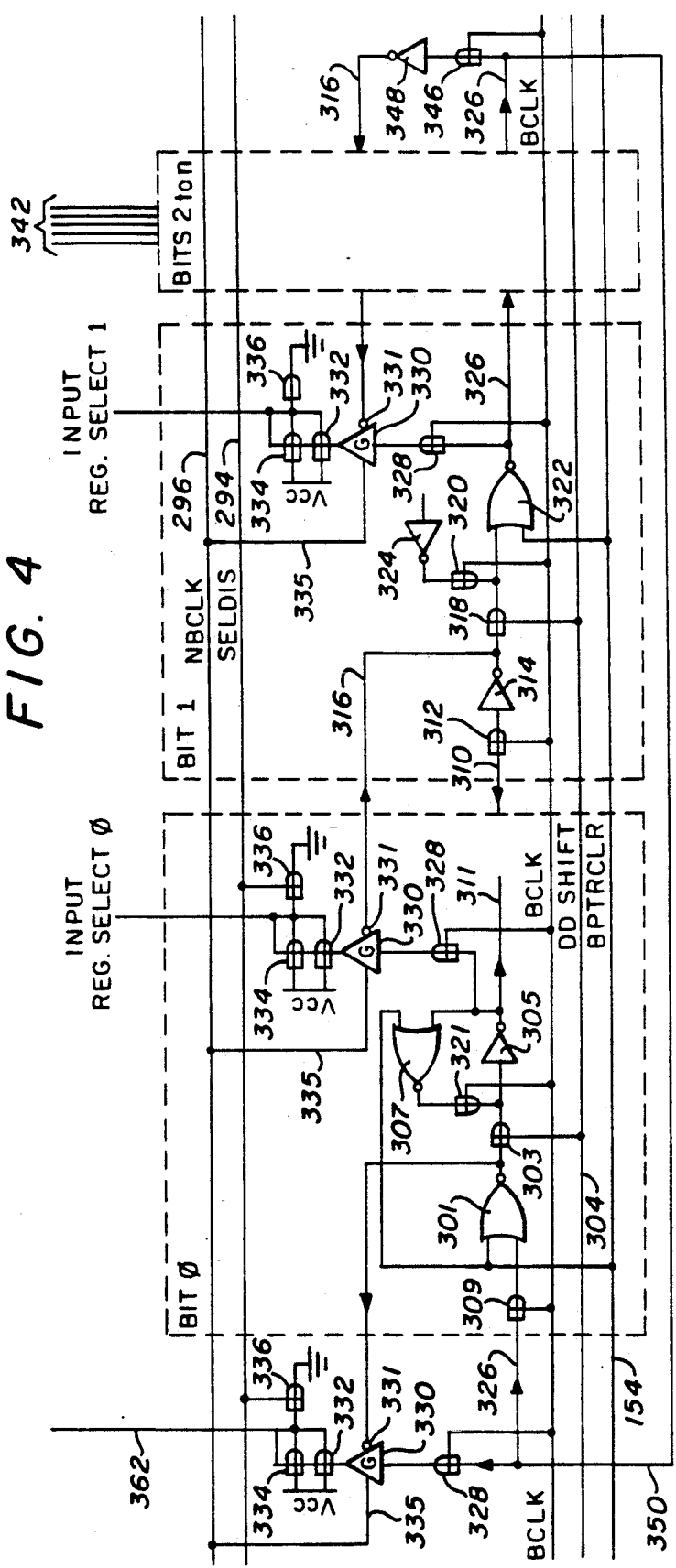
FIG. 4
FIG. 6

ELASTIC BUFFER FOR LOCAL AREA NETWORK

RELATED APPLICATION

This is a continuation application of application Ser. No. 06/808,149, filed Dec. 12, 1985 and entitled "Elastic Buffer For Local Area Networks", now U.S. Pat. No. 4,884,286, issued Nov. 28, 1989.

BACKGROUND

The present invention relates to an elastic buffer for use in a local area network system so that a station in the network which reclocks data and establishes the frequency standard can absorb frequency jitter caused by data acquisition in the other stations of the network.

In a local area network system utilizing ring topology where a self-clocking data scheme is used it is necessary for at least one station to reclock the data and establish the frequency standard for the ring. However, before doing so it is necessary for that station to first absorb the frequency jitter caused by other stations in the system. One way of absorbing this jitter is to use an elastic buffer having a 'FIRST IN FIRST OUT' or FIFO stack together with associated circuitry to control data flow into and out of the stack. Data would be clocked into the buffer on a clock frequency derived from the incoming signal itself and clocked out on a crystal clock of a fixed frequency. Whenever the phase difference between incoming and outgoing data exceeds a predetermined amount an error signal would be recorded and the FIFO reset to its nominal center position. Such a buffer would have to be capable of operating at very high frequencies of several megabits per second and also be capable of reliably recording errors without corrupting the data. The stack must be large enough to deal with normal levels of frequency jitter and be able to record errors and reset the FIFO in response to such errors. Accordingly, it is an object of the present invention to provide an elastic buffer for a local area network system to absorb frequency jitter caused by other stations on the network handling the data.

SUMMARY OF THE INVENTION

According to the present invention there is provided an elastic buffer for absorbing frequency jitter or drift of an incoming data signal which includes a serial stack of data registers, means for storing data bits from an incoming data stream one at a time with each bit adjacent a next earlier bit at a frequency equal to the frequency of the incoming data and means for releasing stored bits onto an output data line. The stored bits are released one at a time at a predetermined fixed rate equal to the average frequency of incoming data from a number of registers away from the register into which data is being written which depends on the frequency difference between incoming data and the fixed rate aforesaid.

Preferably, the stack of data registers is a circular one and the storing means includes a plurality of gates each coupled to an input data line and to an associated one of the data registers of the stack and opened one at a time in series by an input pointer circuit. Similarly, a plurality of gates are each coupled to the output side of a corresponding one of the data registers and to an output data line and are opened one at a time at a gate corresponding to a register which is a number of registers away from that register into which data is being stored determined by the frequency difference between incoming data and the average frequency of the incoming data by an output pointer register.

The buffer includes a circuit for detecting an error when the data register into which data is being written is contiguous to the register from which data is being released onto the data output line. Circuitry is also included to reset the input and output pointer registers in response to such an error so that no further errors can be logged until after the pointers resume their nominal position. This error detection scheme avoids the problem of data corruption which would occur if an error signal were generated only when the input and output pointers were in coincidence. In the latter case there would be a simultaneous reading out and writing in of data bits leading to a strong likelihood of corruption of the earlier stored data bit.

BRIEF DESCRIPTION OF THE DRAWINGS

The novel features believed characteristic of the invention are set forth in the appended claims. The invention itself, however, will be best understood by reference to the detailed description which follows, read in conjunction with the accompanying drawings, wherein:

FIG. 4 is a block diagram of the synchronizer system for the elastic buffer;

FIG. 6 is a circuit diagram of the input pointer register of the FIFO buffer.

DETAILED DESCRIPTION WITH REFERENCE TO THE DRAWINGS

Figure 1:
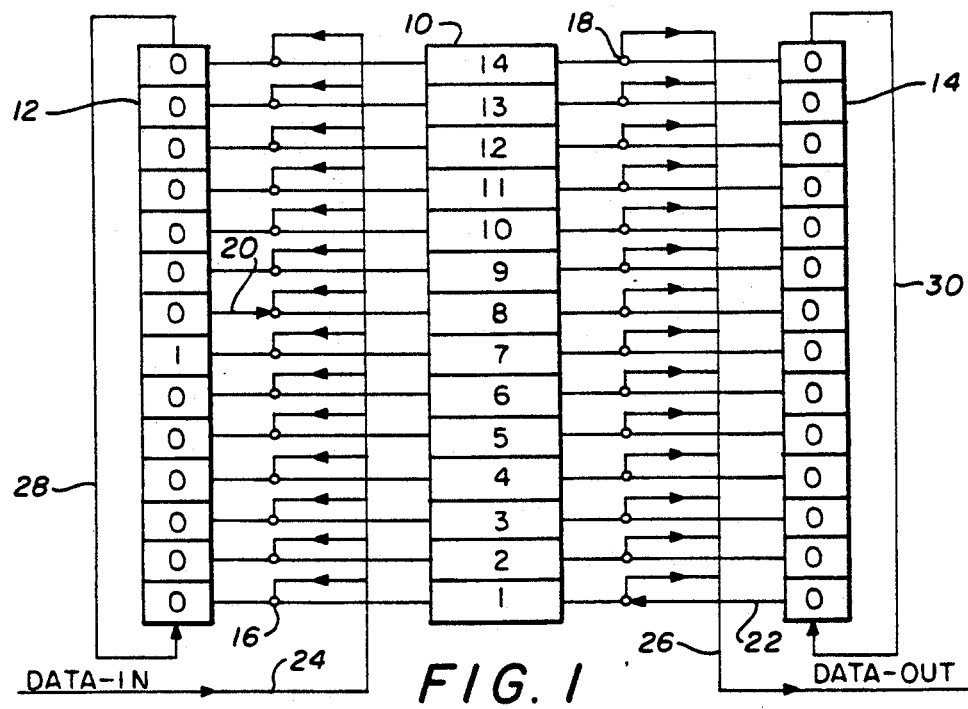
FIG. 1 is a schematic diagram of the input and output pointers and the data registers controlled by the former.

Referring to FIG. 1, the elastic buffer includes a series of 14 data registers 10 which have their respective inputs connected to outputs of associated input gates 16 the inputs of which couple to a Data-In line 24. Each gate 16 is controlled by a gating pulse from a circulating pointer register 12 having 14 bit locations. The overflow from the top end of the circulating register 12 is directed back to the lowermost location by input feedback line 28. A "1" bit in any given bit location will enable the associated gate of input gates 16 and permit it to pass data into the corresponding data register of registers 10.

Similarly, outputs of each data register cell of registers 10 connect to associated ones of 14 output gates which are controlled by an output circulating pointer 14. When the output pointer 22 is alongside a stage of pointer 14 having a "1" data passes through the associated gate from the corresponding data register cell of registers 10 to Data-Out line 26. As with the input circulating register 12, the output circulating pointer 14 moves sequentially from the bottom stage to the top stage, and overflow onto feedback line 30 being directed back again to the lowermost stage.

Figure 2:
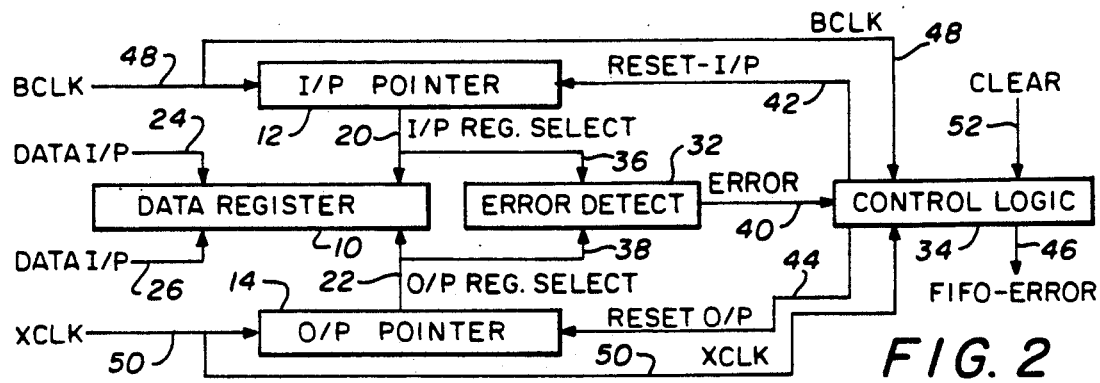
FIG. 2 is a block diagram of the circular FIFO buffer shown schematically in FIG. 1 including the error detect system.

A more complete schematic diagram of the circular FIFO (first-in first-out) buffer shown in FIG. 2 indicates more completely the function of the former. In this case both the input register select signal on line 20 from the input pointer 12 as well as the output register select signal on line 22 from the output pointer 14 are coupled by lines 36 and 38 to an error detect circuit 32 which simply produces an output signal on ERDET line 40 whenever signals are present on contiguous input and output reg. select lines 20 and 22. The output of the error detect circuit 32 goes to a control logic circuit 34 which sends reset signals on input and output reset lines 42 and 44 to reset the input 12 and output 14 pointer circuits. Two clock signals are directed to the control logic circuit 34, namely, BCLK on line 48 and XCLK on line 50. A clear signal one line 52 is also input to the control logic circuit 34.

Whenever an ERDET signal is received on line 40, circuit 34 generates an input reset signal on line 42 on a clock pulse of BCLK and an output reset signal on line 44 on a clock pulse of XCLK. In addition, circuit 34 issues an FIFO error signal on line 46. Upon receipt of respective reset signals input and output pointers 12 and 14 reset to their initial conditions in which a "1" is placed in two cells each register in positions such that there are 6 bit positions between but not including the "1"'s. For example, the input "1" may be put into position 1 and the output "1" into bit position 8 so that each "1" would have to move ahead 7 positions to reach the same relative position as the other bit. Thus, there are 6 stages in which zeros are stored between the positions of stages in which "1"'s are initially stored.

Figure 3:
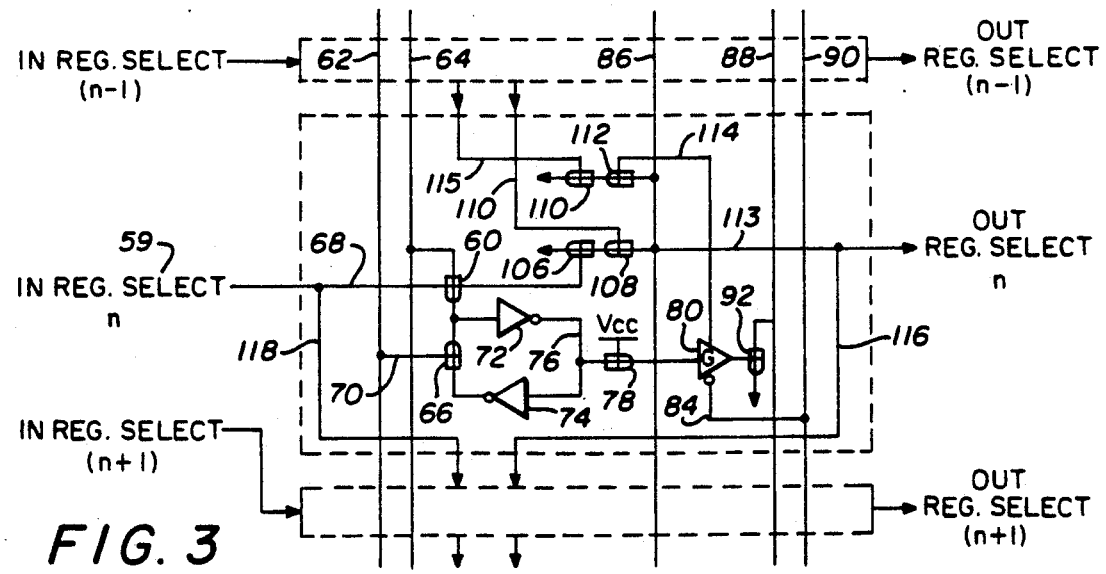
FIG. 3 is a circuit diagram of one of the cells of the data registers in a contiguous access detect arrangement.

Referring to FIG. 3, there is shown a representative cell of one of the 14 cells of the data register 10. In this case an input register select signal from the input pointer circuit is received on line 59 whenever the pointer is opposite a "1" bit. This logic "1" signal is applied to the gate of transistor 60 as well as to transistor 106 turning on both of the latter transistors. Thus, data arriving on Data-In line 64 passes through transistor 60 and is inverted by inverter 72 onto line 76. Inverter 74 inverts the inverted data signal and refreshes the latch input on each BCLK pulse on line 62. The inverted data signal on line 76 passes through transistor 78 whose gate is connected to Vcc to the input of gated clock 80. Gated clock 80 which is a bootstrapped clock driver is clocked by an output register select signal on line 113 which is capacitively coupled to the input and drives the input above Vcc thereby causing transistor 78 to stop conducting. The rapid and large rise on its input voltage causes its output to turn on rapidly and drive transistor 92 on. When transistor 92 turns on, it couples the Data-Out line 88 to ground until an XCLK signal pulls down gate 80. Conversely, a low output signal turns off transistor 92 and allows it to float or be charged up to a preselected voltage.

In the event that the output pointer is alongside the data register (i.e. on line 113) and the input pointer is on the input line of the previous data register then both lines 114 connected to the gate of transistor 112 and line 115 connected to the gate of transistor 110 will be high and clamp error detect line 86 to ground. Similarly, whenever the input pointer is alongside the data register (i.e. on line 59) and the output pointer is opposite the previous data register then both lines 59 and 110 will go high and turn on transistors 106 and 108 thereby grounding error detect line 86. The grounding of error detect line 86 results in the reinitiallizing of the circular FIFO's, clearing of the pointers and triggering of an error log circuit. This is accomplished by feeding the error detect signal to a synchronizer circuit which synchronizes this signal to both BCLK and XCLK in order to clear the pointers 12 and 14.

The synchronizer system as shown in FIG. 4 generates an XPTRCLR signal 2 cycles after the first XCLK signal following entry into latch 116 which resets the output pointer. After 3 cycles of BCLK following entry into latch 116 of a "1", a BPTRCLR signal is generated to clear the input pointer. The additional 1 cycle of delay ensures that the output synchronizer has seen and processed the set/reset latch 116 signal by the time the BPTRCLR signal resets the latch 116.

The synchronizer system of FIG. 4 consists of a transistor gate 120 controlled by NXCLK clock which passes the error detect signal on line 86 through to the input of inverter 122 on each such clock signal. The inverted signal from inverter 122 drives a set/reset latch 116 consisting of NAND circuits 124 and 129 cross coupled by lines 126 and 128. A logic "0" signal on error detect line 86 results in a logic "1" signal on line 128. The latter signal is fed in parallel by lines 130 and 132 into synchronizers 134 and 136 which effect 2 and 3 cycles of delay, respectively, and transmit on XCLK and BCLK clock signals, respectively, by lines 147 and 149 to rising edge detectors 148 and 150, respectively. The rising edge detectors 148 and 150 ensure that the pointers are cleared only once and allow the input pointer clear signal to be used as a log-error signal. The input and output pointers provide outputs on lines 152 and 154, respectively. The 3 cycles of delay on the BCLK synchronizer circuit 136 ensures that the XCLK synchronizer circuit 134 has detected and dealt with the signal on line 130 before the BPTRCLR signal on line 154 clears the latch 116.

Figure 5:
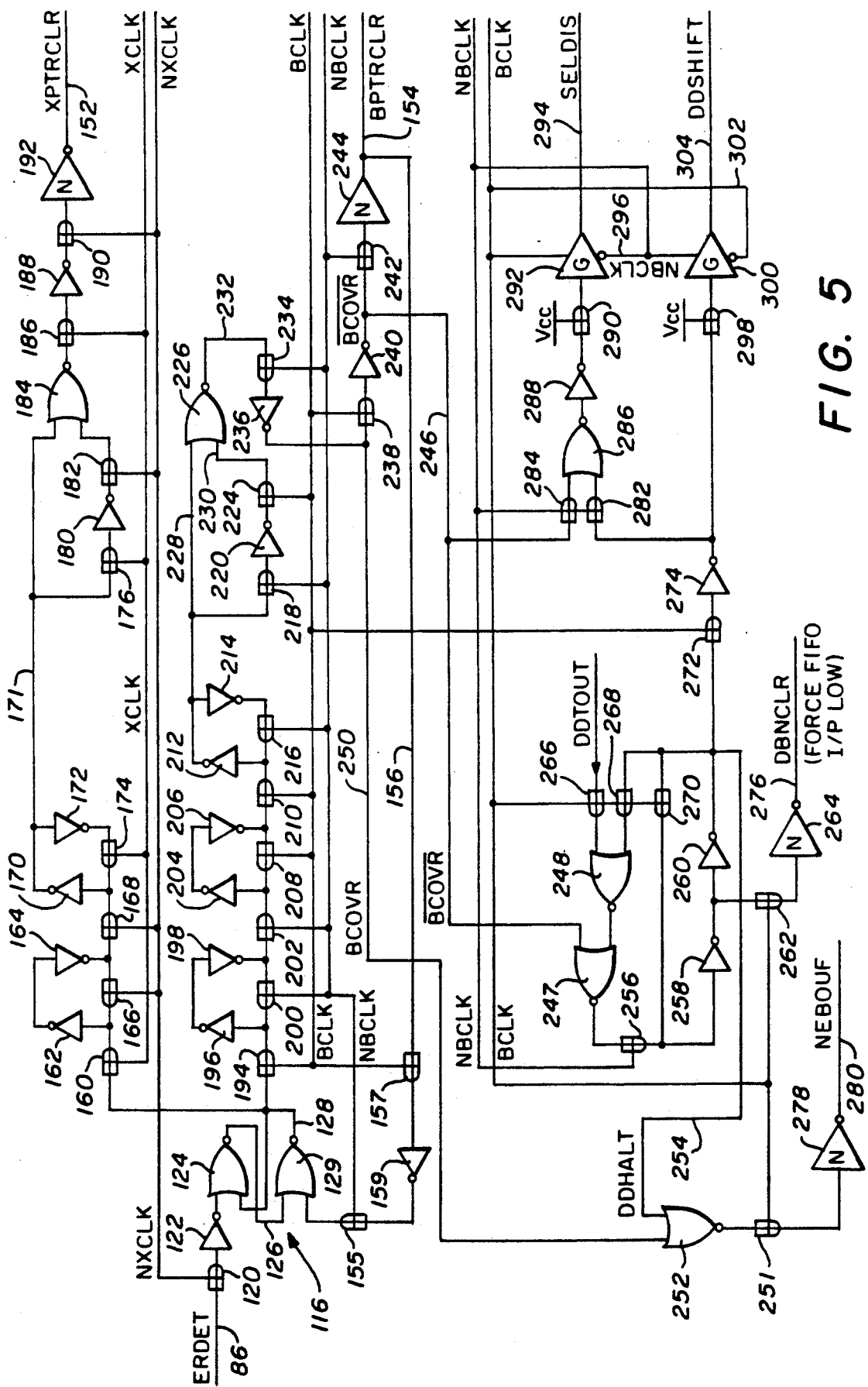
FIG. 5 is a more detailed circuit diagram of the synchronizer system for the elastic buffer.

A more detailed circuit showing the synchronizer system of FIG. 4 as well as circuitry for generating various control signal is shown in FIG. 5. In this case the output from the set/reset latch 116 is clocked by XCLK through transistor 160 into a latch circuit consisting of inverter 162 feeding inverter 164 and the output of inverter 164 being clocked ½ cycle later back to the input of inverter 162 to refresh the latter through transistor 166 by NXCLK clock. NXCLK also clocks the signal through transistor 168 into a second latch consisting of inverters 170 and 172. The output of 172 refreshes the input of 170 on the next XCLK signal and at the same time transmits the output of inverter 170 through transistor 176 to the input of inverter 180. The output of inverter 170 also feeds on line 171 directly into a first input of NOR circuit 184. Since the signal from inverter 180 is that which occurred one cycle earlier relative to the signal on line 171 if there has been a low to high signal transition in that cycle both inputs to NOR circuit 184 will be low and its output will be high. The output of NOR circuit 184 is clocked by XCLK 186 through inverter 188. It is again clocked through transistor 190 by NXCLK to driver-inverter 192 whose output XPTRCLR which is high appears on line 152. Thus, two cycles of NXCLK are required to transmit on XPTRCLR line 152 after clocking in by transistor 120 and so 2 cycles of clock delay occur.

Transistor 194 passes the set/reset latch 116 output on a BCLK clock signal into 3 successive latches consisting of inverters 196, 198, 204, 206, 212 and 214 and gate transistors 200, 202, 208, and 210. Transistors 216, 218 and 224 and inverter 220 perform the same function as transistors 174, 176 and 182 and inverter 180, respectively. The output of NOR circuit 226 on line 232 is clocked by NBCLK through transistor 234 to inverter 236 onto line 250 and clocked by BCLK through transistor 238 and inverter 240 onto line 246. The output of inverter 240 also is clocked by NBCLK through transistor 242 into inverter 244 and out of the latter onto BPTRCLR line 154. The latter output is also fed back through transistor 157 on BCLK through driver 159 and on NBCLK through transistor 155 to NOR circuit 129 to reset the set/reset latch 116.

The output BCOVR on line 250 is coupled to one input of NOR circuit 252. The output of the latter is gated by BCLK through transistor 251 to inverter/-driver buffer 278 to give an active low NEBOUF output on line 276 which indicates an elastic buffer error. The inverse of BCOVR, namely $\overline{BCOVR}$ or (NBCOVR), on line 246 is fed into one input of NOR circuit 247. The output of the latter is gated by NBCLK through transistor 256 into inverter 258. The output of inverter 258, in turn, goes both to inverter 260 and through transistor 262 as gated by BCLK to inverter/-driver buffer 264 and is outputted as DBNCLR on line 276.

The DDHALT output of inverter 260 goes to NOR circuit 252 as its second input, to inverter 274 through transistor 272 gated by BCLK, to one input of NOR circuit 248 through transistor 268 gated by BCLK and through transistor 270 gated by BCLK back to the input of inverter 258 to refresh the signal level at that point. The output of NOR circuit 248 goes to a second input of NOR circuit 247. The second input of NOR circuit 248 is gated through transistor 266 from a DDTOUT signal obtained from another circuit and used to clear the input buffer in a controlled way. Various long term phase errors can accumulate due to such things as crystal changes with temperature. In order to clear the buffer without interfering with normal operation a signal DDTOUT is provided just after a token has passed.

BCOVR line 246 is gated by NBCLK through transistor 284 into NOR circuit 286 and the output of inverter 274 is gated by the same clock signal into a second input of circuit 286. The output of the latter passes through inverter 288, through transistor 290 and is fed into gated clock 292 (similar to gated clock 80) whose output SELDIS on line 294 follows BCLK whenever its input is high and gets pulled down by NBCLK on line 296.

The output of inverter 274 passes through transistor 298 into another gated clock 300 which follows NBCLK on line 296 and gets pulled down by BCLK on line 302. The output of device 300 is is DDSHIFT on line 304. DDSHIFT is the clock which shifts the input pointer 12.

In the normal case when ERDET is high, the signal level on line 128 will be low and that on line 228 will be high. Regardless of the signal on line 230 the signal on line 232 will be low, that on line 250 high and that on line 246 low. The output BPTRCLR on line 154 after passing through transistor 242 gated by NBCLK and passing through buffer/driver 244 will be low.

A high level on line 250 results in a low output from NOR circuit 252 and a high NEBOUF output on line 280 after passing through driver/inverter 278.

When DDTOUT goes high it results in a low output from NOR circuit 248 regardless of the signal level present on DDHALT line 254. With both inputs of NOR circuit 247 low its output goes high causing DDHALT line 254 to go high and DBNCLR line 276 to go high.

When ERDET goes low marking an error condition then the output on line 250 goes low, that on line 246 goes high forcing the output of NOR circuit 247 to go low and DDHALT to go low. With both inputs of NOR circuit 252 low its output goes high and NEBOUF on line 280 goes low.

Normally line 246 is low and the input through transistor 284 is low. At the same time DDHALT is normally low in the absence of both an ERDET signal and a DDTOUT signal. This results in the signal passed through transistor 282 to be high, the output of NOR circuit 286 to be low and the output of inverter 288 to be high allowing BCLK to be generated as SELDIS on line 294. When ERDET goes low, BCOVR line 246 goes high driving NOR circuit 286 to have a zero output and to leave SELDIS running at BCLK. With ERDET high (its normal condition) line 246 is low and to get DDHALT high requires DDTOUT to go high as expained above. This results in both inputs to NOR circuit 286 to go low and its output to go high turning off SELDIS on line 294. At the same time the input to device 300 is low making DDSHIFT stop. Normally DDSHIFT on line 304 runs at NBCLK and is stopped by a DDTOUT signal.

Figure 7:
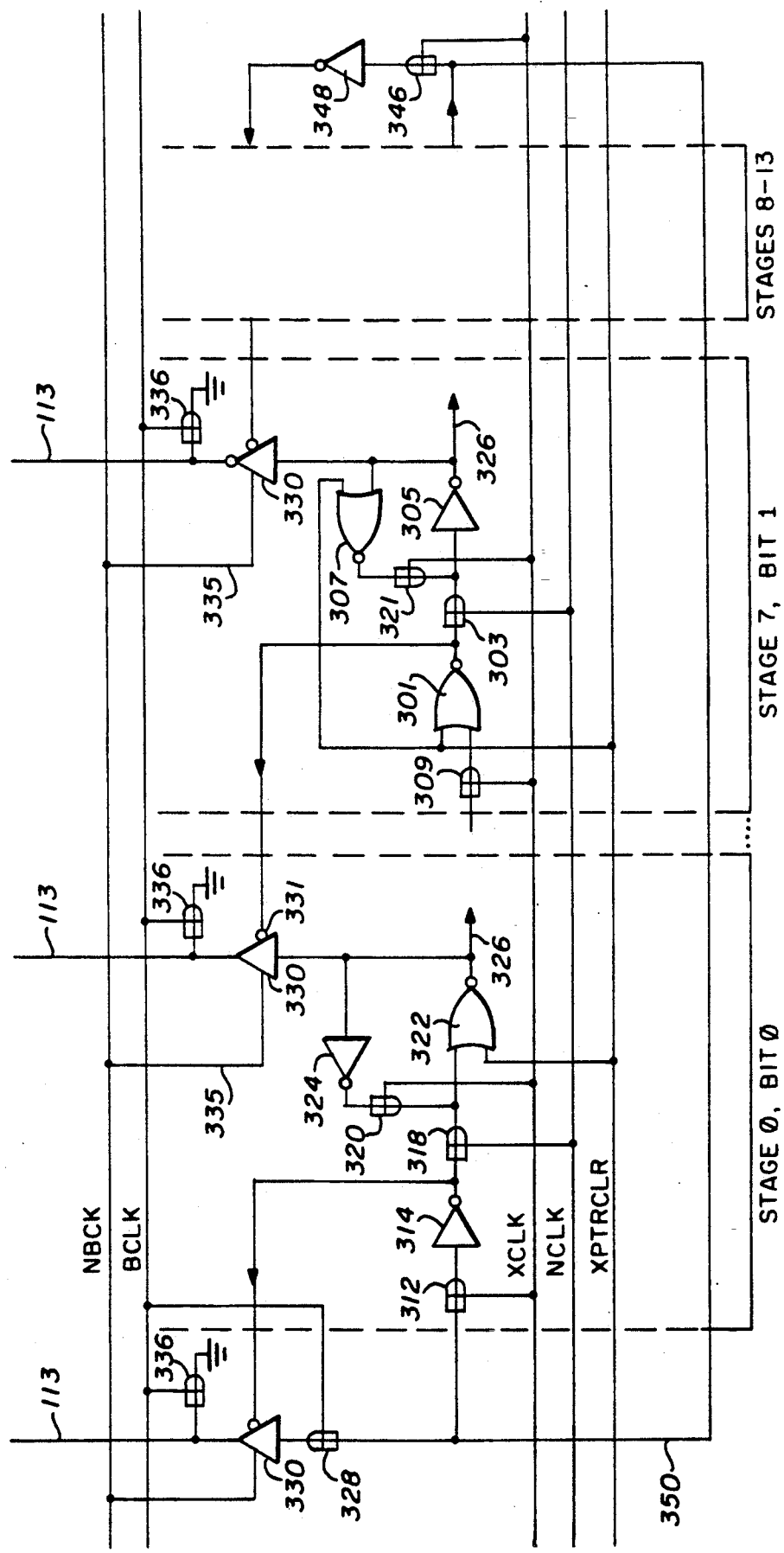
FIG. 7 is a circuit diagram of the output pointer register of the FIFO buffer.

The function of the signals BPTRCLR signal on line 154 is to reset the input pointer circuit 12 on the next BCLK clock signal. The function of the DDSHIFT clock signal on line 304 is to shift bits in the input pointer stages from one stage to the next while the SELDIS clock signal on line 294 grounds the INPUT REG SELECT lines 337, 340, 342 and 362 on each positive half cycle. The logic circuitry of FIG. 5 operates such that upon a DDTOUT signal being generated the input pointer shifts the bits to the next stage then stops. Prior to shifting, these bits are put onto corresponding INPUT REG SELECT lines of associated data register cells 10 and remain as fixed levels. The input pointer 12 then halts so that no further input data flows into the data register cells 10 while the output pointer 14 keeps shifting data out onto Data-Out line 88 until it reaches the cell before the one corresponding to the input pointer stage in which a "1" bit was last stored. This ensures that all data in the cells 10 is extracted in a time which is only long enough to complete extraction before the FIFO is cleared. The input pointer 12 is identical to the output pointer circuit 14 shown in FIG. 7, except for positioning of a bit which resets as "1" rather than "0" and the use of XCLK, NXCLK and XPTRCLR instead of BCLK, NBCLK, BPTRCLR, respectively, and the replacement of SELDIS and DDSHIFT by BCLK and NBCLK, respectively. In the first bit position called bit 0, a transistor 309 couples line 326 to one input of a NOR circuit 301. The other input of the latter is coupled to BPTRCLR line 154 and to an input of NOR circuit 307. The output of NOR circuit 301 is gated by DDSHIFT through transistor 303 to an input of inverter 305. The latter output also goes to the pull down input of gated clock 330 of a previous stage or in the case of bit 0 to the device of bit 13. The output of inverter 305 goes to another input of NOR circuit 307 and also along line 311 to line 310 of the bit 1 stage which is the next adjacent stage. Also coupled to the output of the inverter 305 is a transistor 328 clocked by BCLK which in turn connects to an input of a gated clock 330. The latter has a pull-up input 335 connected to NBCLK line 296 and a pull-down input 331 connected to line 316 of the of the next stage which in this case is bit 1. The output of gated clock 330 gates a transistor 332 coupled between Vcc and INPUT REG SELECT line 337. Transistor 336 is coupled between the latter line and ground and is gated on by SELDIS line 294. Transistor 334 coupled from Vcc to line 337 operates in the depletion mode with its gate connected to line 337 and provides a small current to line 337 when transistor 332 is off. An extra gated clock 330 and transistors 332, 334 and 336 is provided adjacent the first stage in order to provide an IN REG SELECT line 362 corresponding to line 115 shown in FIG. 2.

In operation whenever a reset pulse appears on BPTRCLR line 154 it drives the output of NOR circuit 307 to ground and on BCLK the input of inverter 305 low as well. Thus the output of inverter 305 goes high. On BCLK transistor 328 passes this signal on to the input of gated clock 330 which will follow NBCLK on the line 335 since the signal on pull-down input 331 is low. Thus, line 337 will be driven to Vcc on each positive cycle of NBCLK on line 296 and to ground otherwise by the turning on of transistor 336 by SELDIS signal on line 294. The BPTCLR signal on line 154 starts on NBCLK and transistor 303 is gated also on NBCLK so that the output of line 311 is reset immediately to 1. The next BCLK puts a zero on both inputs of NOR circuit 301 which results in a "1" output from that device. The next DDSHIFT pulse which occurs on NBCLK shifts this "1" level to the input of inverter 305 and drives its output to zero and at the same time pulls down gated clock 330 of the previous stage which in this case is bit 13.

Each of the other stages is identical to that shown for bit 2. In this case transistor 312 gated by BCLK couples to an input of inverter 314. The output of the latter is coupled by line 316 to a pull-down input 331 of a gated clock 330 of a previous stage. It is also coupled through transistor 318 gated by DDSHIFT to one input of NOR circuit 322. The other input of NOR circuit 322 is coupled to BPTRCLR. The output of NOR circuit 322 couples by line 326 to a transistor 312 of a subsequent stage and also to the input of an inverter 324 coupled through transistor 320 gated by BCLK to the one input of NOR circuit 322. Line 326 is also coupled through transistor 328 gated by BCLK to gated clock 330 connected in an identical arrangement as in the previous stage for bit 0.

On receiving a BPTCLR signal NOR circuit 322 drives lines 326 low which is refreshed by interter 324 and transistor 320 on the next half cycle. Thus the output on INPUT REG SELECT line 340 will be at or near ground by the cyclical grounding through transistor 336.

On the BCLK pulse after NBCLK and BPTRCLR has gone positive, transistor 312 of the next stage (i.e. bit 1) couples the high level to inverter 314 of that level. On the next NBCLK signal when DDSHIFT goes high a zero input is fed into an input of NOR circuit 322. Thus, the output of the latter goes high since BPTRCLR is now low. Each of the outer stages is set to zero since the signal on line 312 will be low not high. The high level is passed thus in sequence from one stage to the next.

The function of SELDIS is to ground all of the INPUT REG SELECT lines 337, 340 and 342 once for a half cycle of every cycle. The function of DDSHIFT is to step the bits of each stage of the pointers 12 from one stage to the next. DDSHIFT stops when the latch at the input to transistor 272 contains a "1" and the latter occurs whenever BCOVR is low and DDTOUT is high. DDSHIFT shuts off first and on the next half cycle SELDIS shuts off. On the last positive cycle of DDSHIFT, there will be a shift of the bit in each stage to the next. On the same half cycle NBCLK puts the previous bit values on the corresponding INPUT REG SELECT lines. On the next half cycle transistors 309 and 312 fire pulling down all gated clocks 330 to ground.

The input pointer 12 will halt leaving the output pointer 14 running and reading out data in the data register cells 10 until it reaches the cell adjacent the one in which data was last stored in the input pointer before the final shift. An error signal on ERDET line 86 will occur and, subsequently, change BCOVR from "0" to "1" restarting SELDIS first and then a half cycle later DDSHIFT. SELDIS grounds all outputs setting them to "0". The signals XPTRCLR and BPTRCLR reset the latches of the output and input pointers 12 and 14, respectively, and then DDSHIFT begins shifting data again. While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A circuit for absorbing frequency jitter of data bits incoming on an input data line, comprising:
   a serial connected loop stack of data register cells;
   circuitry for storing each incoming data bit in a selected one of said cells within said serial connected loop stack wherein each bit is stored at a first frequency in a cell adjacent a cell in which is stored a next earlier bit; and
   circuitry for directing stored data from a selected one of said cells within said serial connected loop stacked onto an output data line at a second frequency, wherein said circuitry for directing is operable to direct data bits simultaneously with said circuitry for storing.

2. The circuit for absorbing frequency jitter of claim 1 wherein said data bits arrive at a third frequency and wherein said first frequency is equal to said third frequency.

3. The circuit for absorbing frequency jitter of claim 1 wherein said data bits arrive at a third frequency and said second frequency equals the average of said third frequency.

4. The circuit for absorbing frequency jitter of claim 1 wherein said circuitry for storing said data bits is operable to store said data bits one at a time into said cells.

5. The circuit for absorbing frequency jitter of claim 1 wherein said circuitry for directing comprises:
   a pluratily of output gates each coupled between the output data line and an output of a corresponding one of said cells; and
   an output pointer circuit selectively coupled to each of said output gates and operable to open each output gate when coupled thereto to allow transmission of a data bit from said cell to the output line.

6. The circuit for absorbing frequency jitter of claim 5 wherein said output pointer comprises a plurality of latches, each one of said latches corresponding to one output gate and one cell of said stack, wherein all latches except a selected latch will operate in a first state while the selected latch operates in a second state, the second state operating to open the output gate corresponding to the selected latch and wherein the next latch to be selected is adjacent the currently selected latch.

7. The circuit for absorbing frequency jitter of claim 1 wherein said circuitry for storing comprises:
a plurality of input gates each coupled between the input data line and an input of a corresponding one of said cells; and
an input pointer circuit selectively coupled to each of said input gates and operable to open each input gate when coupled thereto to allow transmission of a data bit from said input line into a corresponding cell.

8. The circuit for absorbing frequency jitter of claim 7 wherein said input pointer comprises a plurality of latches, each one of said latches corresponding to one input gate and one cell of said stack, wherein all latches except a selected latch will operate in a first state while the selected latch operates in a second state, the second state operating to open the input gate corresponding to the selected latch, and wherein the next latch to be selected is adjacent the currently selected latch.

9. The circuit for absorbing frequency jitter of claim 1 and further comprising circuitry for generating an error detection signal when the cell into which a data bit is being stored is contiguous to a cell from which a data bit is being directed to the output line.

10. The circuit for absorbing frequency jitter of claim 9 and further comprising circuitry for resetting said storing circuitry and said directing circuitry when said generating circuitry generates an error detection signal.

11. A circuit for absorbing frequency jitter of data bits incoming on an input data line, comprising:
a serial connected loop stack of data register cells;
circuitry for storing each incoming data bit in a selected one of said cells within said serial connected loop stack wherein each bit is stored at a first frequency; and
circuitry for directing data from a selected one of said cells within said serial connected loop stack onto a output data line at a second frequency, wherein said circuitry for directing is operable to direct data bits simultaneously with said circuitry for storing and wherein said circuitry for directing directs data to said output line from the specific cell which the data was originally stored in by said circuitry for storing.

* * * * *